United States Patent Office 3,394,998
Patented July 30, 1968

3,394,998
NOVEL FLUORO COMPOUNDS
William B. Fox, Morristown, Richard E. Eibeck, Convent Station, and James S. MacKenzie, Morris Plains, N.J., assignors to Allied Chemical Corporation, New York, N.Y., a corporation of New York
No Drawing. Filed June 23, 1966, Ser. No. 559,743
3 Claims. (Cl. 23—356)

ABSTRACT OF THE DISCLOSURE

Novel solid compounds of the type $F_3NO \cdot X$, wherein X is $AsF_5$ or $SbF_5$, are disclosed; these compounds are prepared by reacting $F_3NO$ with $AsF_5$ or $SbF_5$; they are useful as intermediates for storing the normally gaseous high energy oxidizer $F_3NO$ in the form of a stable solid from which the $F_3NO$ readily may be liberated by appropriate heating for use.

---

This invention relates to novel compounds of the formula:

$$F_3NO \cdot X$$

wherein X may be $AsF_5$ or $SbF_5$.

These compounds may be prepared by reacting trifluoramine oxide ($F_3NO$) and the X component, i.e., either arsenic pentafluoride ($AsF_5$) or antimony pentafluoride ($SbF_5$) over a wide range of conditions including those of room temperature and atmospheric pressure.

As in the case with the compound $F_3NO \cdot BF_3$, disclosed in co-pending, commonly assigned application of James S. MacKenzie and William B. Fox, Ser. No. 214,157, filed July 23, 1962, now Patent No. 3,323,866, the $F_3NO \cdot X$ compounds of the invention afford a means for purifying crude $F_3NO$. This is accomplished herein by treating the impure $F_3NO$ with one of the subject X components to form a reaction mass containing $F_3NO \cdot X$ and the impurities contributed from the crude $F_3NO$, which impurities may then be readily separated from the reaction mass by distillation. The purification of $F_3NO$ is otherwise rather difficult because of the presence of certain impurities, particularly $N_2O$, which possess boiling points close to that of $F_3NO$. The boiling points of the $F_3NO \cdot X$ compounds are sufficiently distinct from such impurities as to readily permit effective separation.

$F_3NO$ is a known material which, especially in purified form, is a useful missile ingredient, a powerful high energy oxidizer for missile fuels and a valuable intermediate for the preparation of other high energy propellant oxidizers.

The novel $F_3NO \cdot X$ compounds are also valuable intermediates themselves.

Unlike the $F_3NO \cdot BF_3$ compound mentioned supra which decomposes above about $-50°$ C.; the $F_3NO \cdot X$ compounds of the invention are stable solids at room temperature (about 25° C.) from which $F_3NO$ may readily be liberated and thus, unlike $F_3NO \cdot BF_3$, are valuable in that they provide a means for storing the normally gaseous $F_3NO$ compound in the form of a stable solid.

In general, preparation of the novel $F_3NO \cdot X$ compounds is accomplished by introducing into a reaction zone $F_3NO$ and one of the X components and maintaining these materials in the reaction zone at a temperature and for a residence time sufficient to form the solid $F_3NO \cdot X$ product.

$F_3NO$ has a boiling point of about $-89°$ C. at atmospheric pressure, a melting point of about $-161°$ C. and is a colorless gas at standard conditions. Preparation of this compound is known. The product and illustrative procedures for making the same are more fully described in copending applications of MacKenzie, Fox and Vanderkooi, Ser. No. 179,521, and of MacKenzie and Fox, Ser. No. 179,520, each filed Mar. 9, 1962, and in copending application Ser. No. 214,157 mentioned supra. A particularly effective procedure for preparing $F_3NO$ is the one described in co-pending application Ser. No. 179,520 mentioned supra, and comprises essentially reacting oxygen difluoride ($OF_2$) and trifluoramine ($NF_3$) at temperatures in the range of about $-160$ to $-196°$ C. and at pressures in the range of about 0–150 mm. of Hg, while under the influence of an electrical discharge.

Arsenic pentafluoride ($AsF_5$) is a well known compound and is commercially available. It has a melting point of about $-79.8°$ C., a boiling point of about $-53.2°$ C. and is a colorless gas at standard conditions.

Antimony pentafluoride ($SbF_5$) is also a commercially available known compound. It has a melting point of about 7° C., a boiling point of about 149.5° C. and is a colorless, somewhat viscous liquid at standard conditions.

The $F_3NO \cdot X$ compounds are formed essentially quantitatively by reacting equivalent weights of gaseous $F_3NO$ and the X component. In the case of $F_3NO \cdot AsF_5$, the reaction will proceed readily at about room temperature with virtual quantitative yields being obtainable by merely combining equal volumes of the gaseous $F_3NO$ and the gaseous $AsF_5$ at this temperature. The reaction of gaseous $F_3NO$ and liquid $SbF_5$ proceeds somewhat more reluctantly and equivalent yields, at room temperature, are achieved only after somewhat more prolonged treatment of liquid $SbF_5$ with preferably a slight excess of $F_3NO$ (say about 10%) until one mole of $F_3NO$ has been consumed for each mole of $SbF_5$ present.

Preparation of either of the $F_3NO \cdot X$ compounds may be effected, if desired, over a relatively wide temperature range, say from about $-196°$ C. to about 40° C. As indicated above, room temperature is very suitable and is generally most convenient. The preferred operating temperature range may be said to lie between about 0° C. and 25° C.

The reaction will proceed under atmospheric, superatmospheric or subatmospheric pressures. Since the reaction does, however, proceed best in the absence of air and other non-condensibles; it is accordingly preferred to operate under at least a partial vacuum in order to minimize the effect of these factors. Moreover, moisture in the air will react adversely with the $F_3NO \cdot X$ products. Consequently, it is preferred to operate under essentially anhydrous conditions.

Apparatus suitable for practice of the invention may include any conventional apparatus adapted to facilitate handling and contacting of gaseous reactants under conditions of at least partial vacuum. The reactor may be provided with reactant charging equipment which may include a valved outlet which facilitates sealing off the reactor and alternative opening of the same to afford connection of the reaction zone with a high vacuum suction conduit, which in turn may have associated therewith various cold traps.

Residence times of $F_3NO$ and the X component in the reactor required to approximate quantitative yields will vary depending upon such variables as reaction temperature, proportions of reactants and size of the operation. In the case of the formation of the $F_3NO \cdot AsF_5$ compound at room temperature, for example, residence times are quite short, say in the order of about 5–15 minutes for small scale operations. In the case of the formation of the $F_3NO \cdot SbF_5$ compound, residence times are somewhat longer and under analogous conditions are in the order of about 1½ to 3 hours.

The solid $F_3NO \cdot X$ products may contain trace quantities of such compounds as NOF, $NO_2F$, $SiF_4$, $N_2O$ and $NF_3$, as impurities, some of which materials may have been brought in as impurities in the initial reactants and some of which may be reaction by-products. The ordinarily small quantities present of such materials may not deleteriously affect the properties of the $F_3NO \cdot X$ compounds for some purposes; however, if desired, the $F_3NO \cdot X$ products may be further purified. This may be accomplished in situ in the reaction zone. Such purification involves separating from the solid $F_3NO \cdot X$ product in the reaction zone, materials which are volatile at temperatures higher than about room temperature (25° C.). To effect such purification, the reaction zone may be connected through a valved outlet with a vacuum line operated at a pressure lower than about 5 mm. of Hg. Preferably, the vacuum line includes a cold trap maintained about −196° C. It has been found that impurities and by-products such as indicated may be stripped out of the $F_3NO \cdot X$ reaction product mass by subjecting the same to evacuation at a pressure below about 5 mm. of HG and while maintaining the materials being stripped out at temperatures at or below about 25° C. Under these conditions, decomposition or other loss of the $F_3NO \cdot X$ product is minimized and compounds such as the unreacted $F_3NO$, any unreacted X component and other by-products and impurities such as described above, may be effectively stripped out of the $F_3NO \cdot X$ reaction mass, thus leaving in the reaction zone a substantially pure solid $F_3NO \cdot X$ product. Volatiles pulled off during evacuation may be condensed out of the vacuum line by means of the −196° C. cold trap, if employed. Evacuation time is variable and is dependent largely upon the size of a given operation. In small-scale work 15–30 minutes may be adequate. In reasonably large scale operations, however, evacuation time should be at least about an hour, and still preferably in the range of about 1 to 3 hours. If the gases being removed are passed into a −196° C. trap in a vacuum system, the end point of evacuation may be visually determined by noting whether additional material condenses on the walls of the −196° C. cold trap.

Purification of $F_3NO$ by use of the $F_3NO \cdot X$ compounds may be accomplished by treating the crude $F_3NO$ with one of the X components as described above to form the corresponding $F_3NO \cdot X$ reaction mass. The contained impurities may then be separated from the $F_3NO \cdot X$ reaction mass by the procedure outlined above. The $F_3NO$ content of the $F_3NO \cdot X$ complexes may then be readily recovered by mild treatment with an alkali metal fluoride, e.g., KF, RbF, CsF or NaF, as shown by the following illustrative equation:

$$F_3NO \cdot AsF_5 + MF \rightarrow MASF_6 + F_3NO$$

wherein M denotes an alkali metal. The reaction is preferably carried out in the presence of a solvent medium such as anhydrous HF. The HF may be mixed with the $F_3NO \cdot X$ material following which the MF reactant may be formed in situ by adding an alkali metal or the alkali metal fluoride may be added per se. As may be seen from the above equation one mole of MF reactant should be present for every mole of $F_3NO \cdot X$ material in order to completely take up the X component. Temperatures are not critical and are preferably between about −80° C. and 25° C. Atmospheric or sub- or superatmospheric pressures may be employed.

Example 1

A 30 ml. glass tube reactor was charged with 152 mm. of $F_3NO$ gas and was connected to a like vessel which in turn was charged with an equal amount of $AsF_5$ gas, the two reactors being connected with a stop cock in a closed position. The stop cock was opened, allowing the gases to mix, at which time a white solid immediately formed in the reaction vessels. After 5 minutes, the pressure in the reactor system dropped from an initial total pressure of 304 mm. to 20 mm. The solid product was identified as $F_3NO \cdot AsF_5$. Elemental analysis of the product gave the following results.

*Analysis.*—Calculated for $F_3NO \cdot AsF_5$: F, 59.17%; As, 29.17%; N, 5.44%. Found: F, 58.70%; As, 29.17%; N, 5.60%.

An infrared spectrum of the residual gas above the solid showed the presence of only traces of $F_3NO$, $SiF_4$ and $CF_4$, indicating that the solid consisted of an almost quantative yield of $F_3NO \cdot AsF_5$. Confirmation of the existence of the $F_3NO \cdot AsF_5$ compound was made by forming a sample of the complex on $BaF_2$ windows of a gas infrared cell and observing the spectrum peaks. The following peaks were observed: 5.4, 8.6, 11.1 and 14.0 microns. The first three peaks provide evidence for the presence of $F_2NO^+$ cations and the 14.0 micron peak is characteristic of $AsF_6^-$ anions. These results were consistent with the expected structure. Further confirmation was obtained by comparing the pertinent NMR signals of a 5 mole percent solution of the $F_3NO \cdot AsF_5$ compound in liquid $AsF_3$ at 0° and in anhydrous hydrogen fluoride. In both cases the NMR spectrum showed a triplet resonance (ratio 4:5:4) at $\Delta CCl_3F = -331$ p.p.m. with a nitrogen-fluorine spin-spin coupling constant $J_{NF} = 245$ c.p.s. A broad resonance at $\Delta CCl_3F = +44$ p.p.m. was also observed. The −331 p.p.m. signal is attributed to $F_2NO^+$ cations and the +44 p.p.m. signal is attributed to $AsF_6^-$ anions. The $F_3NO \cdot AsF_5$ product was for all practical purposes stable at 25° C., the equilibrium pressure of each component at that temperature being approximately 5–10 mm. $F_3NO \cdot AsF_5$ is slightly soluble in liquid HF above −20° C. but is more soluble in liquid $AsF_3$ (10 mole percent solubility at 0° C.).

Example 2

0.065 ml. of liquid $SbF_5$ was dissolved in 0.3 ml. of liquid HF in a Halon (fluorocarbon resin) tube. 24 cc. (1 mmole) of gaseous $F_3NO$ were bubbled through the solution at −78° C. The HF solvent was stripped from the residue by pumping the reaction vessel under vacuum, leaving a white residue of $F_3NO \cdot SbF_5$.

*Analysis.*—Calculated for $F_3NO \cdot SbF_5$: N, 4.60%; Sb, 40.08%; F, 50.04%. Found: N, 4.70%; Sb, 41.35%; F, 48.30%.

The dissociation pressure of the $F_3NO \cdot SbF_5$ product at 25° C. was extremely low, as indicated by the difficulty of subliming it in vacuo and by the absence of detectable $F_3NO$ or $SbF_5$ in the gas phase when the complex is kept under high vacuum in an infrared gas-cell.

Example 3

0.15 g. (0.69 mmole) of $SbF_5$ and 17 cc. (0.69 mmole) of $F_3NO$ were condensed into a Halon tube at the temperature of liquid nitrogen (−196° C.). Over 92% conversion of $F_3NO \cdot SbF_5$ was obtained by repeatedly warming the mixture to −78° C. and cooling it to −196° C. over a period of about two hours. A sample of the $F_3NO \cdot SbF_5$ compound was formed directly in a gas infrared cell equipped with $BaF_2$ windows. The peaks observed were at 5.4, 8.6 and 11.1 microns which were identical to the ones observed for the $F_3NO \cdot AsF_5$ compound of Example 1 and characterized $F_2NO^+$ cations. NMR analyses of solutions of $F_3NO \cdot SbF_5$ in $AsF_3$ and in HF show the typical $F_2NO^+$ cation triplet at $\Delta CCl_3F = -331$ p.p.m. ($J_{NF}=245$ c.p.s.).

We claim:
1. Compounds of the formula:

$$F_3NO \cdot X$$

wherein X is $AsF_5$ or $SbF_5$.

2. A compound according to claim 1 which is $F_3NO \cdot AsF_5$.

3. A compound according to claim 1 which is $F_3NO \cdot SbF_5$.

OTHER REFERENCES

Stacey et al.: Advances of Fluorine Chemistry, vol. 4, 1965, published by Butterworths, Washington, D.C., pp. 208 and 210.

Schmeissew et al.: Anger. Chem., vol. 69, 1957, p. 780.

OSCAR R. VERTIZ, *Primary Examiner.*

H. S. MILLER, *Assistant Examiner.*